United States Patent [19]
Cheng

[11] Patent Number: 5,361,718
[45] Date of Patent: Nov. 8, 1994

[54] REFLECTIVE WARNING DEVICE FOR WHEELED VEHICLES

[76] Inventor: Tien-Chu Cheng, No. 65, Shui Gin Street, Shui Yuan Tsuen, Hsin Ser Hsiang, Taichung, Taiwan, Prov. of China

[21] Appl. No.: 147,324

[22] Filed: Nov. 3, 1993

[51] Int. Cl.⁵ .......................... B60Q 1/26; G02B 5/12
[52] U.S. Cl. .................. 116/28 R; 359/525; 359/550
[58] Field of Search ............... 116/28 R, 264, 265; 359/520, 522, 525, 549, 550; 446/217, 218

[56] References Cited

U.S. PATENT DOCUMENTS

| | | | |
|---|---|---|---|
| 576,119 | 1/1897 | Koebel | 446/217 |
| 1,542,731 | 6/1925 | Schortmann | 446/217 X |
| 1,764,180 | 6/1930 | Moreland | 446/217 |
| 4,103,924 | 8/1978 | Suhm | 116/28 R X |
| 4,120,561 | 10/1978 | Burkholder | 446/217 X |
| 4,767,185 | 8/1988 | Lyons | 359/525 |
| 5,014,641 | 5/1991 | Johnson | 116/28 R |
| 5,267,525 | 12/1993 | Person et al. | 116/202 |

Primary Examiner—William A. Cuchlinski, Jr.
Assistant Examiner—Willie Morris Worth
Attorney, Agent, or Firm—Bacon & Thomas

[57] ABSTRACT

A reflective warning device for vehicles includes a body having a rim, the rim has a reflective outer peripheral surface, a number of spokes are extended radially in the body, the body is rotatably coupled to the vehicle, the reflective light of the body can be seen from various directions when the body moves relative to the wind.

2 Claims, 3 Drawing Sheets

REFLECTIVE WARNING DEVICE FOR WHEELED VEHICLES

BACKGROUND OF THE INVENTION

1. Field of the Invention

The present invention relates to a device, and more particularly to a reflective warning device for wheeled vehicles.

2. Description of the Prior Art

A typical reflective warning device for a bicycle is disclosed in FIG. 5 and includes a reflective member 50 coupled to the head tube 60 by a ring member which is fixed in place by a nut 61 or the like, the reflective member 50 is fixed to the ring member by an extension 51; however, the reflective light of the reflective member 50 can be seen only in the definite direction perpendicular to the reflective member 50, the reflective light can not be seen from the side portion of the bicycle, this is dangerous for the riders of the bicycles.

The present invention has arisen to mitigate and/or obviate the afore-described disadvantages of the conventional reflective warning devices.

SUMMARY OF THE INVENTION

The primary objective of the present invention is to provide a reflective warning device in which the reflective light can be seen from various directions.

In accordance with one aspect of the invention, there is provided a reflective warning device for vehicles comprising a body including a rim having a reflective outer peripheral surface, and a plurality of spokes extended radially in the body, and means for rotatably supporting the body, whereby, reflective light of the body is seen from various directions.

A space is formed between every two adjacent spokes, a tapered element is extended in each of the spaces, whereby, a rotational force is applied to the tapered element when the body moves relative to a wind.

The rotatably supporting means includes a barrel having a bore formed therein, and a shaft extended from the body and rotatably engaged in the bore of the barrel such that the body is rotatably coupled to the barrel.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
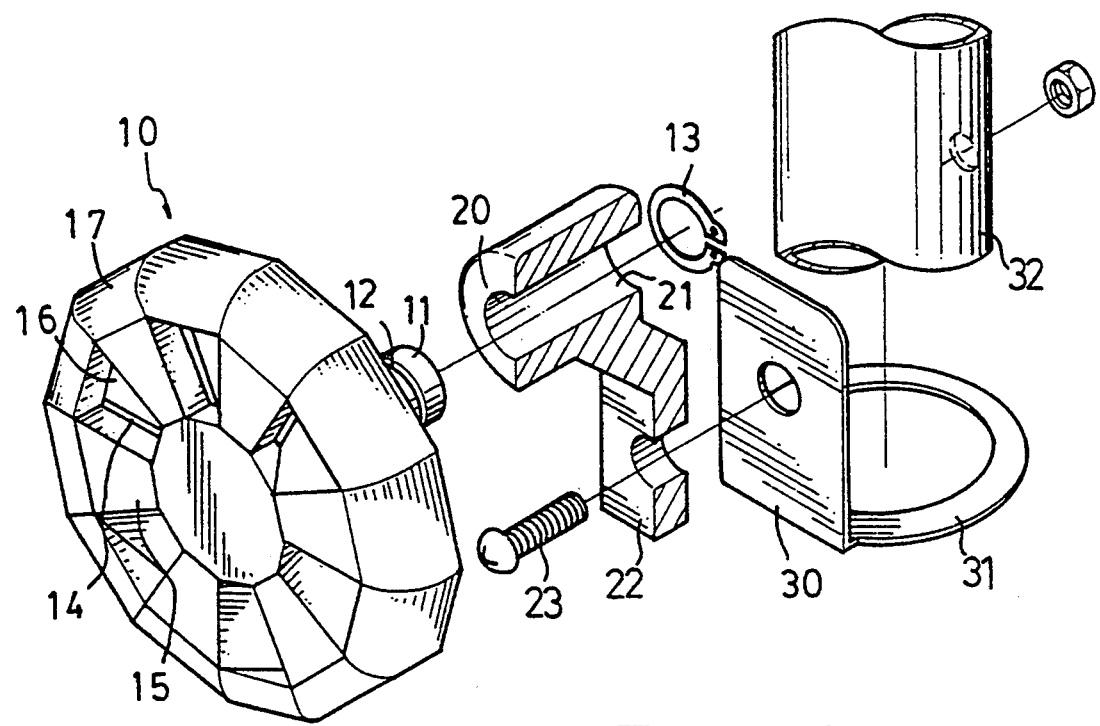
FIG. 1 is an exploded view of a reflective warning device in accordance with the present invention.
Figure 2:
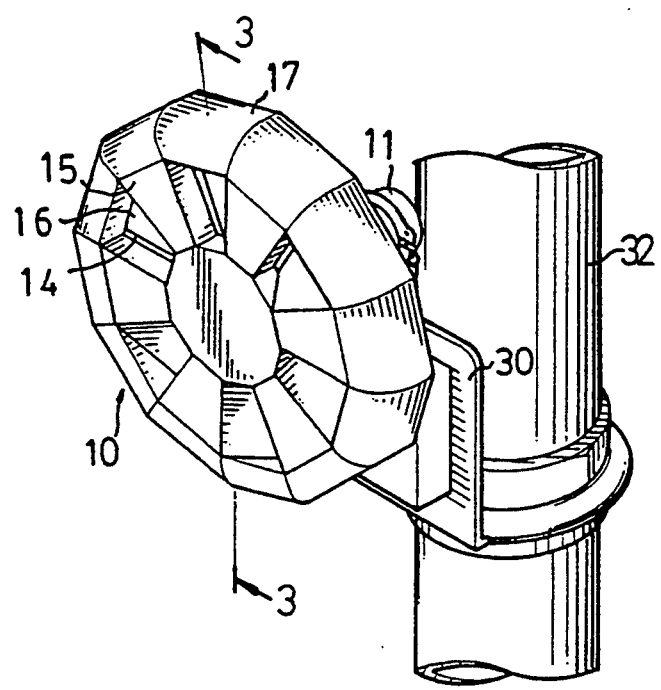
FIG. 2 is a perspective view of the reflective warning device.
Figure 3:
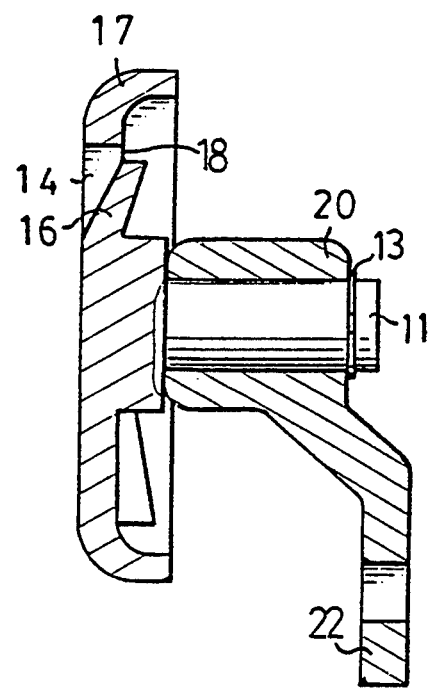
FIGS. 3 and 4 are cross sectional views taken along lines 3—3 of FIG. 2.

Referring to the drawings, and initially to FIGS. 1 to 3, a reflective warning device in accordance with the present invention comprises a body 10 including a shaft 11 extended therefrom for rotatably engaging in a bore 21 of a barrel 20 of a bracket 22 which is fixed to a board 30 by a screw 23, the board 30 being fixed to a ring 31 which is secured on the head tube 32 of a bicycle, an annular groove 12 formed in the shaft 11 for engaging with a ring element 13 so as to retain the shaft 11 within the bore 21 of the barrel 20.

The body 10 includes a rim 17 having a reflective outer peripheral surface, it is preferable that the outer peripheral surface thereof is separated into a plurality of segment of reflective surfaces, a plurality of spokes 15 radially extended therein, a plurality of spaces 14 formed between the spokes 15, and a tapered element 16 provided in each of the spaces 14, it is to be noted that the tapered element 16 does not fully extended in the spaces 14 and arranged such that a gap 18 is formed in each of the spaces 14. It is preferable that the spokes 15 also include a reflective outer surface for reflecting purposes.

In operation, when the body 10 is moved with the bicycle, the relative wind to the body 10 may apply a force against the tapered elements 16 in order to generate a rotational force against the body 10, the light reflected by the reflective surfaces of the spokes 15 and of the rim 17 may be seen from various directions, particularly, the light reflected by the reflective surfaces of the rim 17 may be seen from the side portion of the bicycle, this greatly increases the safety effect of the riders of the bicycles.

Figure 4:
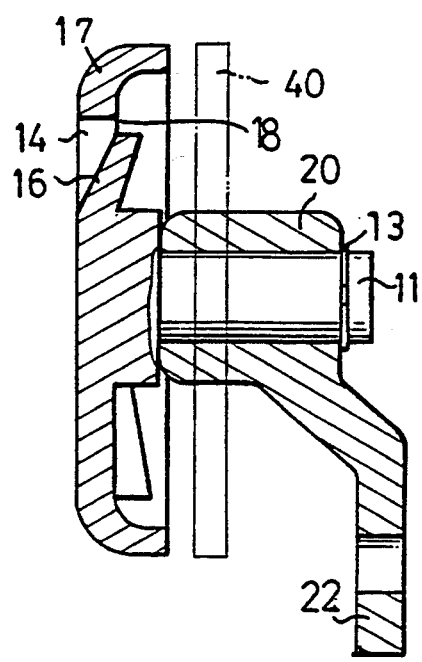
Figure 5:
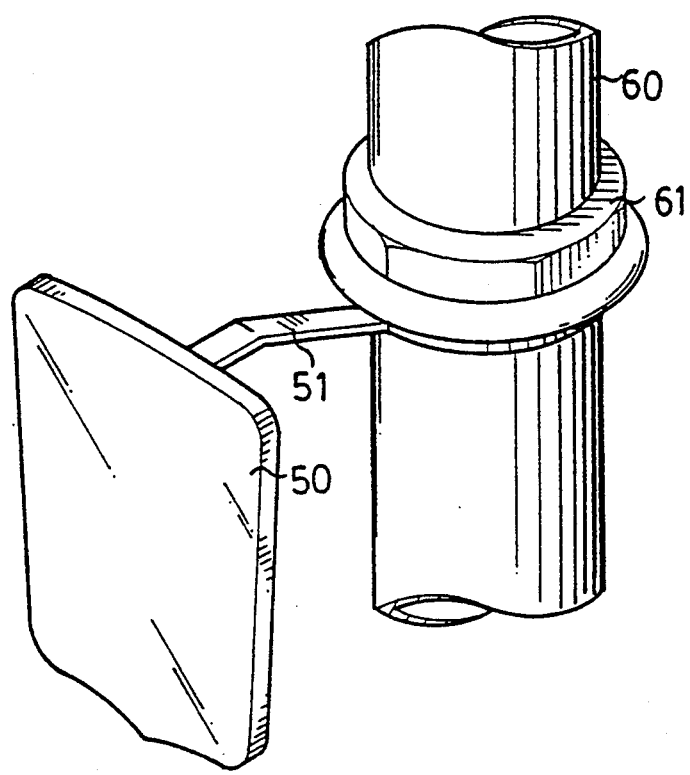
FIG. 5 is a perspective view of the typical reflective warning device.

Referring next to FIG. 4, another reflective plate 40 may be fixed on the barrel 20, the light reflected by the reflective plate 40 may be seen through the gaps 18 of the body 10, the reflective light is similar to a flash light, this further facilitates the warning effect of the bicycle.

Accordingly, the reflective warning device in accordance with the present invention includes a reflective light which can be seen from various directions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A reflective warning device for a vehicle comprising a body including a rim having a reflective outer peripheral surface facing radially outward so as to be seen from various directions, a plurality of spokes extended radially inwards from said rim to a central hub, and means connected to said central hub for rotatably supporting said body on said vehicle, a space formed between every two adjacent spokes, a tapered element extending from one of said every two adjacent spokes into said space and arranged to leave a gap between the tapered element and a second of said every two adjacent spokes for rotatably driving said body when subject to air currents.

2. A device according to claim 1, wherein said means for rotatably supporting said body includes a barrel having a bore formed therein, and a shaft extended from said central hub of said body and rotatably engaged in said bore of said barrel such that said body is rotatably coupled to said barrel.

* * * * *